US008447151B2

(12) United States Patent
Morris

(10) Patent No.: US 8,447,151 B2
(45) Date of Patent: May 21, 2013

(54) TRIPLEXER FOR AN OPTICAL FIBER, PACKAGE INCLUDING THE SAME, AND ASSOCIATED METHODS

(75) Inventor: James E. Morris, Charlotte, NC (US)

(73) Assignee: DigitalOptics Corporation East, Charlotte, NC (US)

( * ) Notice: Subject to any disclaimer, the term of this patent is extended or adjusted under 35 U.S.C. 154(b) by 373 days.

(21) Appl. No.: 12/947,555

(22) Filed: Nov. 16, 2010

(65) Prior Publication Data

US 2011/0116801 A1 May 19, 2011

Related U.S. Application Data

(60) Provisional application No. 61/272,891, filed on Nov. 16, 2009.

(51) Int. Cl.
*G02B 6/34* (2006.01)
*H04J 14/02* (2006.01)

(52) U.S. Cl.
USPC .................. 385/37; 385/36; 385/47; 398/86; 398/87

(58) Field of Classification Search
USPC ..................................................... 398/86, 87
See application file for complete search history.

(56) References Cited

U.S. PATENT DOCUMENTS 6,768,834 B1 * 7/2004 Gruhlke .......................... 385/24

* cited by examiner

*Primary Examiner* — Jerry Rahll
(74) *Attorney, Agent, or Firm* — Lee & Morse, P.C.

(57) ABSTRACT

A triplexer including an optics block including a first port configured to receive a first light beam at a first wavelength and a second light beam at a second wavelength, and a second port configured to receive a third light beam at a third wavelength, a bounce cavity between the first and second ports, the bounce cavity being formed by opposing reflective elements adjacent respective surfaces of the optics block, a first grating opposite the first port, the first grating receiving all three light beams at substantially a same location thereon, the first grating configured to provide the first and second light beams to the bounce cavity and the third light beam to the first port, and a second grating opposite the second port, the second grating receiving the first and second light beams at spatially separated portions thereon.

27 Claims, 15 Drawing Sheets

10
300
114
150a
150b
160
111c
112a
121
172
181
112
112b
110
111d
111a
171
111
111b
113
182
122a
122b
122c
122
210
200
z
x

- 4 phase grating
- Tp = 1.7um - mfs 0.425um
- Al coating

| 4phase | | | | | | | | | |
|---|---|---|---|---|---|---|---|---|---|
| wavelength | inc angle | period | 1st order | depth | index | ang | -2 order | -1 order | 0 order |
| 1.55 | 0 | 1.7 | 71.60% | 0.56 | 1.44396 | 39.15596 | NA | 18.7% | 4.9% |
| 1.49 | 0 | 1.7 | 74.10% | 0.56 | 1.4446 | 37.35286 | NA | 14.5% | 6.6% |
| 1.31 | 0 | 1.7 | 72.80% | 0.56 | 1.44673 | 32.1841 | NA | 1.6% | 19.6% |
| 1.55 | 55.66 | 1.7 | 71.60% | 0.56 | 1.44396 | 39.15596 | 18.4% | NA | 6.3% |
| 1.49 | 52.5 | 1.7 | 74.40% | 0.56 | 1.4446 | 37.35286 | 13.4% | NA | 8.2% |
| 1.31 | 44.15 | 1.7 | 72.90% | 0.56 | 1.44673 | 32.1841 | 18.0% | NA | 4.1% |
| | laser | 53.07% | -2.75 | | | | | | |
| | 1490 det | 55.13% | -2.59 | | | | | | |
| | 1550 det | 51.27% | -2.90 | | | | | | |

FIG. 5

Insertion Loss (dB)- Single Depths

| Depth (um) | 0.455 | 0.5 | 0.54 | 0.55 |
|---|---|---|---|---|
| 1310 - 90 | -3.8 | -8.47 | -17 | -20.1 |
| 1490 - 0 | -3.4 | -2.85 | -2.65 | -2.6 |
| 1490 - 90 | -1.2 | -1.75 | -2.9 | -3.3 |
| Delta | -2.2 | -1.1 | 0.25 | 0.7 |
| 1550 - 0 | -4 | -3.3 | -3 | -2.95 |
| 1550 - 90 | -1.2 | -1.5 | -2 | -2.25 |
| Delta | -2.8 | -1.8 | -1 | -0.7 |

Insertion Loss (dB)- 2 Depths

| Depth (um) | 0.455 | 0.5 | 0.54 | 0.55 |
|---|---|---|---|---|
| 1310 - 90 | -2.4 | -4.7 | -9 | -10.6 |
| 1490 - 0 | -3.4 | -2.85 | -2.65 | -2.6 |
| 1490 - 90 | -1.2 | -1.75 | -2.9 | -3.3 |
| Delta | -2.2 | -1.1 | 0.25 | 0.7 |
| 1550 - 0 | -4 | -3.3 | -3 | -2.95 |
| 1550 - 90 | -1.2 | -1.5 | -2 | -2.25 |
| Delta | -2.8 | -1.8 | -1 | -0.7 |

| Depth (um) | 0.455 | 0.5 | 0.54 | 0.55 |
|---|---|---|---|---|
| 1310 - 90 | -2.4 | -4.7 | -9 | -10.6 |
| 1490 - 0 | -3 | -2.8 | -2.6 | -2.62 |
| 1490 - 90 | -2.1 | -2.3 | -8.85 | -3.06 |
| Delta | -0.9 | -0.5 | 0.25 | 0.44 |
| 1550 - 0 | -3.5 | -3.1 | -2.95 | -2.9 |
| 1550 - 90 | -2 | -2.2 | -2.5 | -2.54 |
| Delta | -1.5 | -0.9 | -0.45 | -0.36 |

Common Grating 121 - must work for all wavelengths, skewed to detectors

Best case - rotate laser on side, then can use 0deg pol. Eff. for 1310

| | 1540 | 1550 | 1560 | 1480 | 1490 | 1500 | 1298 | 1310 | 1321 |
|---|---|---|---|---|---|---|---|---|---|
| depth | 0.58 | 0.58 | 0.58 | 0.58 | 0.58 | 0.58 | 0.58 | 0.58 | 0.58 |
| 0deg | 78.8% | 78.4% | 77.9% | 81.0% | 80.7% | 80.4% | 78.5% | 79.1% | 79.6% |
| 90deg | 79.3% | 79.5% | 79.6% | 74.3% | 75.9% | 77.1% | 23.1% | 9.1% | 6.6% |

Laser diodes polarized parallel to short axis (beam divergence)

| | 1550 | 1555 | 1560 | 1480 | 1490 | 1500 | 1298 | 1310 | 1321 |
|---|---|---|---|---|---|---|---|---|---|
| depth | 0.48 | 0.48 | 0.48 | 0.43 | 0.43 | 0.43 | | | |
| 0deg | 88.7% | 88.6% | 88.6% | 87.5% | 87.2% | 86.9% | | | |
| 90deg | 85.5% | 86.0% | 86.4% | 89.0% | 89.4% | 89.7% | | | |

TRIPLEXER FOR AN OPTICAL FIBER, PACKAGE INCLUDING THE SAME, AND ASSOCIATED METHODS

CROSS-REFERENCE TO RELATED APPLICATION

This application claims priority to U.S. Provisional Application Ser. No. 61/272,891, entitled "Triplexer for an Optical Fiber, Package Including the Same, and Associated Methods," which was filed in the USPTO on Nov. 16, 2009, the entire contents of which are hereby incorporated by reference and for all purposes.

BACKGROUND

1. Field

Example embodiments relate to a triplexer. In particular, example embodiments relate to a triplexer for fiber to the home (FTTH) system and a package including the same.

2. Description of the Related Art

Bidirectional transceivers. i.e., devices that simultaneously receive incoming signals and transmit outgoing signals, are an essential component of any passive optical network (PON), e.g., FTTH system. The transceivers provide the interface between the end user and the optical network. For example, in FTTH systems, the transceivers receive information at two wavelengths, e.g., 1490 nm and 1550 nm, and transmit at a single wavelength, e.g., 1310 nm. Thus, every end user requires a triplexer to separate these three wavelengths. A conventional triplexer may include thin film filters to process three wavelengths. However, manufacturing of conventional thin film filters is expensive and, therefore, overall manufacturing costs of the conventional triplexer may be high.

SUMMARY

Embodiments are therefore directed to a triplexer and a package including the same, which substantially overcome one or more of the problems due to the limitations and disadvantages of the related art.

It is therefore a feature of an embodiment to provide a triplexer with a plurality of gratings to reduce manufacturing costs.

It is therefore another feature of an embodiment to provide a package with a triplexer having a plurality of gratings to reduce manufacturing costs.

At least one of the above and other features and advantages may be realized by providing a triplexer including an optics block including a first port configured to receive a first light beam at a first wavelength and a second light beam at a second wavelength, and a second port configured to receive a third light beam at a third wavelength, a bounce cavity between the first and second ports, the bounce cavity being formed by opposing reflective elements adjacent respective surfaces of the optics block, a first grating opposite the first port, the first grating receiving all three light beams at substantially a same location thereon, the first grating configured to provide the first and second light beams to the bounce cavity and the third light beam to the first port, and a second grating opposite the second port, the second grating receiving the first and second light beams at spatially separated portions thereon, the second grating configured to provide the first and second light beams adjacent the second port.

The triplexer may further include another optics block, another optics block including parallel first and second surfaces, first and second detectors mounted on the another optics block, the first and second detectors mounted to receive the first and second light beams, respectively, and bonding pads directly on the another optics block for the first and second detectors.

The first surface of the another optics block may include a first portion and a second portion, the first portion being substantially parallel to the second surface, and the second portion being angled at an acute angle with respect to the first portion.

The first and second detectors may be on the first portion of the first surface, and the bonding pad may extend on the first and second portions of the first surface.

The optics block may include a first optics block and a second optics block, the first and second optics blocks being stacked on each other.

The first and second detectors may be directly on a first surface of the second optics block, the first surface of the second optics block facing away from the first optics block.

The first grating may be between the first and second optics blocks, the second grating is on a first surface of the first optics block facing away from the second optics block. The triplexer may further include first and second lenses on the second optics block facing the first optics block between the second grating and the first and second detectors.

The second grating may be on a second surface, parallel to the first surface, of the first optics block.

The triplexer may include first and second bonding pads directly on the first surface of the second optics block, the first and second bonding pads being adjacent to the first and second detectors.

The first surface of the second optics block may include a first portion and a second portion, the first portion being substantially parallel to the second surface of the second optics block. The second portion may be angled at an acute angle with respect to the first portion.

The first and second detectors may be on the first portion of the first surface of the first optics block, and the first and second bonding pads may extend on the first and second portions of the first surface of the second optics block.

The second optics block may be a silicon optics block. The first optics block may be a silicon oxide optics block. The second grating may be on a first surface of the first optics block facing away from the second optics block. The second gating may include first through third sections corresponding to the spatially separated portions. Each of the first through third section may have different etch depths.

The second grating may also receive the third light beam at a spatially separated portion from the first and second light beams. The second grating may include first through third sections corresponding to the spatially separated portions. Each of the first through third section may have different etch depths.

The triplexer may include a highly reflective coating on at least one of the first and second gratings.

The optics block may include opposing parallel first and second surfaces, the first port, the first mirror, and the second grating being on the first surface, and the first grating, second mirror, and the second port being on the second surface.

The triplexer may include a replication material on at least one of the first and second surfaces, wherein a grating on a surface containing replication material is in the replication material.

The triplexer may include a collimating lens collimating the third light beam.

The triplexer may include a lens adjacent the first port, the lens focusing the third light beam outside the triplexer and collimating the first and second light beams.

The may include a half-wave plate adjacent the second port.

One of the opposing reflective elements may be a selectively reflective element that transmits light at the third wavelength and reflects light at the first and second wavelengths.

The selectively reflective element may be adjacent the second port.

The triplexer may include a third grating, adjacent the second port, the third grating configured to provide the third light beam to the bounce cavity.

At least one of the above and other features and advantages may be realized by providing a communication package including an optical fiber and a triplexer connected to the optical fiber according to any one of the configurations described above.

The optics block may include first and second optics blocks stacked on each other. The first and second detectors may be directly on the second optics block.

The light source may be mounted on the optics block.

An output face of the light source may be mounted orthogonal to the second port.

BRIEF DESCRIPTION OF THE DRAWINGS

The above and other features and advantages will become more apparent to those of ordinary skill in the art by describing in detail embodiments with reference to the attached drawings, in which:

FIG. 5 illustrates a table of grating parameters according to a specific example for the triplexer of FIG. 1;

DETAILED DESCRIPTION

Figure 1:
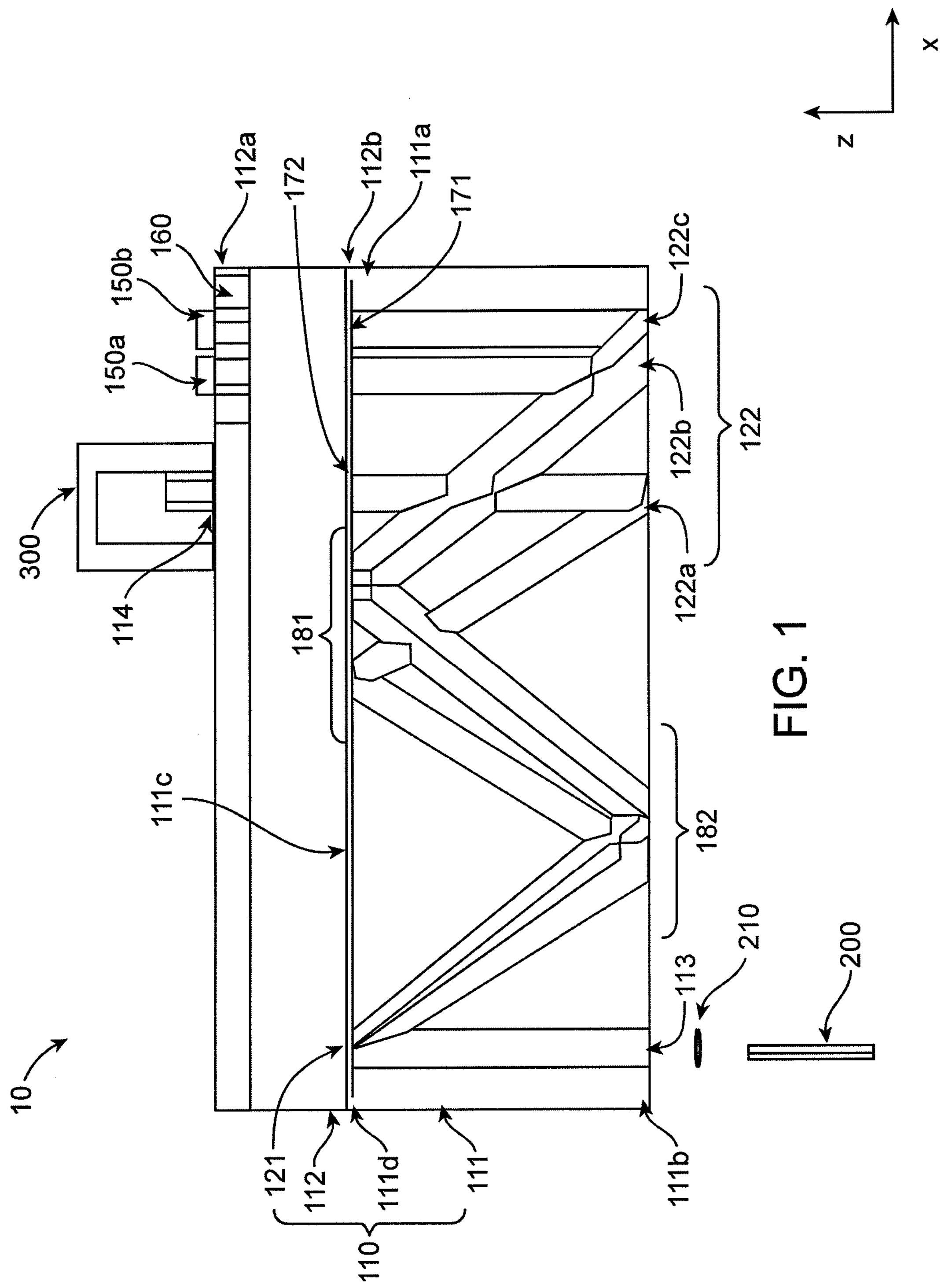
FIG. 1 illustrates a cross-sectional view of a triplexer according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements and regions may be exaggerated for clarity of illustration. It will also be understood that when an element is referred to as being "on" another element, it can be directly on the other element, or intervening elements may also be present. Further, it will be understood that when an element is referred to as being "between" two elements, it can be the only element between the two elements, or one or more intervening elements may also be present. In addition, it will also be understood that when an element is referred to as being "optically connected to" an element, it can be an only element in a direct optical path from the element, or one or more intervening elements may also be present. As used herein, the term "wafer" is to mean any substrate on which a plurality of components are formed on a planar surface which are to be separated through the planar surface prior to final use. Like reference numerals refer to like elements throughout.

As illustrated in FIG. 1, a triplexer 10 according to embodiments may include at least one optics block 110, dispersive elements 121, 122, mirrors 181, 182 forming a bounce cavity, and first and second optical detectors 150*a* and 150*b*. The first and second optical detectors 150*a*, 150*b* may be directly on the optics block 110. The dispersive elements 121 may be diffractive elements between first and second optics blocks 111, 112 forming in the optics block 110. Therefore, manufacturing and operation of the triplexer 10, e.g., when detecting simultaneously received/transmitted optical signals via multiple wavelengths, may be substantially improved.

In particular, the use of micro-optics allows really small beam diameters to be realized. Further, the wavelengths used in a triplexer are typically relatively far apart, e.g., different by at least tens of nanometers. Therefore, path lengths of a bounce cavity, e.g., between mirrors, may be sufficient to allow a diffractive element diffracting different wavelengths at different angles to provide beams of different wavelengths separated enough to serve as a wavelength filter without unduly increasing the triplexer size. For example, dimensions of the optics block 110, i.e., stacked first and second optics blocks 111 and 112, may be about 6.7×3.3×1.0 $mm^3$.

The first optics block 111 may be, e.g., a silicon oxide ($SiO_2$) wafer. The second optics block 112 may be, e.g., a silicon wafer. The first and second optics blocks 111 and 112 may be stacked on top of each other, e.g., via bonding, so passive optical elements, e.g., mirrors, lenses, diffractive gratings, etc., may be positioned on any of the surfaces of the first and second optics blocks 111 and 112. If required, additional optics blocks may be bonded to the optics block 110. As used herein, bonding may include any type of attachment, including the use of bonding materials, surface tension or directly forming on the same optics block. The first and second optics block 111, 112 may be of any material, e.g., a transparent material, and, if optical elements are to be created in the optics block 110, the material may also suitable for optical creation of optical elements therein.

As illustrated in FIG. 1, the first optics block 111 may include first and second surfaces 111*a* and 111*b* opposite each other. For example, the second surface 111*b* of the first optics block 111 may be substantially flat, and may be parallel to a bottom surface 112*a* of the second optics block 112. The second surface 112*b* of the second optics block 112 may be have lenses 171, 172 therein, so that the lenses 171, 172 may be between the stacked first and second optics blocks 111 and 112. The lenses 171, 172 may be created directly by lithography or may be replicated. If replicated, the lenses 171, 172 may be transferred into the second optics block 112 or may remain in the replication material.

The first optics block 111 may include a recessed portion 111*c* to accommodate the lenses 171, 172. The second surface 112*b* of the second optics block 112 may be between the first and second optics blocks 111 and 112, and may contact, e.g., directly contact, a portion 111*d* of the first optics block 111 outside the recessed portion 111*c*.

Figure 2:
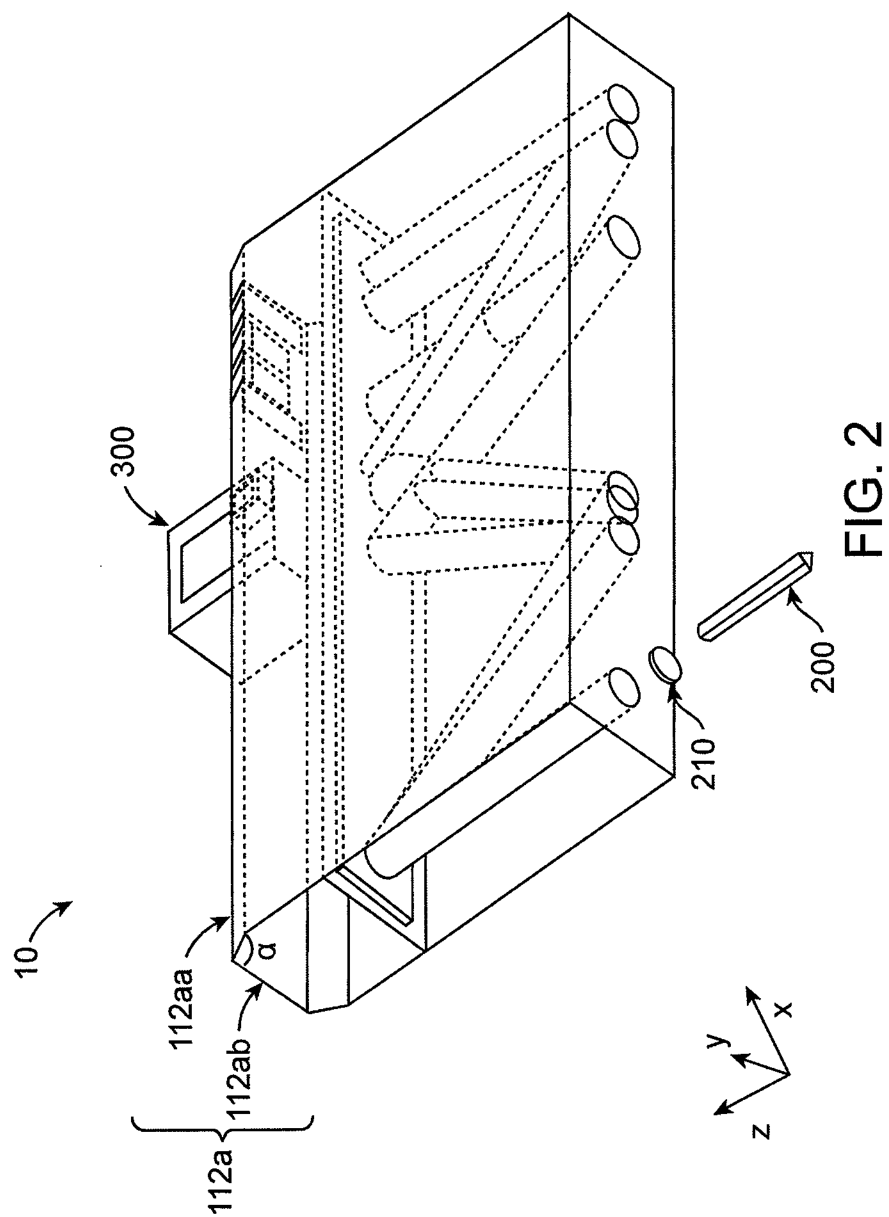
FIG. 2 illustrates a perspective view of a triplexer of FIG. 1.

The first surface 112*a* of the second optics block 112 may face away from the first optics block 111 when the first and second optics blocks 111 and 112 are stacked. As illustrated in FIG. 2, edges of the first surface 112*a* may be processed, e.g., removed, so peripheral portions of the first surface 112*a* may be angled with respect to the bottom surface 112*b* of the second optics block 112. That is, the first surface 112*a* may include a first portion 112*aa* and a second portion 111*ab*, e.g., the first portion 112*aa* may extend along the x-axis and may be centered between two second portions 112*ab* that extend along the x-axis. The first portion 112*aa* of the first surface 112*a* may be substantially parallel to the second surface 112*b* of the second optics block 112. The second portions 112*ab* of the first surface 112*a* may extend from the first portion 112*aa* and may be angled with respect to the first portion 112*aa*. For example, an angle α between the first and second portions 112*aa* and 112*ab* may be about 60°, i.e., when measured within the second optics block 112. While both of edges of the first surface 112*a* are illustrated as being angled, only the edge on which the first and second detectors 150*a*, 150*b* are to be wire bonded may be angled.

As illustrated in FIG. 1, the dispersive elements 121, 122 of the triplexer 10 may be on the second optics block 112. The dispersive elements may include first and second diffractive elements 121 and 122 for splitting light output by an optical fiber 200 and delivering the split light, i.e., a plurality of separate wavelengths, to the detectors 150*a*, 150*b* via a plurality of optical elements, e.g., lenses, mirrors, etc. The first and second diffractive elements 121 and 122 may also direct light incident thereon at yet another wavelength output by a light source 300. The first and second diffractive elements 121 and 122 may provide separation to beams delivered to top and bottom surfaces of the second optics block 112, respectively. For example, the first diffractive element 121, e.g., a grating, may be between the first and second optics blocks 111 and 112, i.e., facing the second surface 111*b* of the first optics block 111, and the second diffractive element 122, e.g., a grating, may be on the bottom surface 112*a* of the second optics block 112, i.e., facing away from the second surface 111*b* of the first optics block 111.

For example, the first and second gratings 121 and 122 may be spaced apart from each other along a longitudinal direction of the triplexer 10, i.e., along the x-axis, so the first and second gratings 121 and 122 may be adjacent to opposite edges of the triplexer 10. The first and second gratings 121 and 122 may disperse light at different wavelengths, so isolation between the different wavelengths may be very high. Use of two gratings may compensate for wavelength variation induced angle change. Further, since manufacturing of the first and second gratings 121 and 122 is simpler and cheaper, e.g., as compared to conventional thin film filters, overall manufacturing costs of the triplexer 10 may be substantially reduced.

For example, the first grating 121 may be positioned between the first and second optics blocks 111 and 112 opposite a first port 113, i.e., a connection point between the optical fiber 200 and the triplexer 10. In other words, the first grating 121 may overlap the first port 113, so optical signals, i.e., light, from the optical fiber 200 may be incident on the first grating 121. The light from the optical fiber 200 may first traverse a lens 210 that collimates the light. The second grating 122 may be positioned on the bottom surface 111*b* of the first optics block 111 opposite the first and second detectors 150*a*, 150*b* on the second optics block 111 and a second port 114, i.e., a connection point between the light source 300 and the triplexer 10. The second grating 122 may overlap the detectors 150*a*, 150*b*, so separate wavelengths reflected from the second grating 122 toward the first optics block 111 may be normally incident on the detectors 150*a*, 150*b*. The second grating 122 may also overlap the second port 114 for the light source 300, so light received from the light source may be normal on the second grating 122.

The second grating 122 may include three grating sections 122*a*, 122*b*, and 122*c*, for the three different wavelengths, e.g., 1310 nm, 1490 nm, and 1550 nm, respectively. In accordance with the present embodiment, the first and second gratings 121, 122 may have the same grating period and the same etch depth. A particular example design for the first and second gratings 121, 122 is illustrated in FIG. 5. Typically, this grating will be optimized for the received wavelengths, e.g., the 1490 nm and 1550 nm wavelengths. In the specific example illustrated, the first and second gratings 121, 122 is a 4 phase grating with a grating period of 1.7 μm having a minimum feature size (MSF) of 0.425 μm and an etch depth of 0.56 μm.

The first and second detectors 150*a*, 150*b*, e.g., a photo detector, may be positioned directly on the first surface 112*a*, e.g., via bonding using vision based alignment. For example, the first and second detectors 150*a*, 150*b* may respectively detect the 1490 nm and 1550 nm wavelengths and may be directly on the first surface 112*a*, e.g., adjacent to each other at one edge of the triplexer 10.

The lens 171 may be aligned with each detector 150*a*, 150*b* such that a predetermined wavelength reflected from the second grating 122 may be focused through the first lens 171 to be incident on the corresponding detector 150*a*, 150*b*. Since the detector 150*a*, 150*b* is directly on the second optics block 111, i.e., directly on the first surface 112*a*, manufacturing of the triplexer 10, e.g., in terms of costs and time, may be substantially simplified. Further, the structure of the inventive triplexer 10 may be minimized to simplify and reduce size of an optical package including the same, as will be discussed in more detail below with reference to FIGS. 3 and 4A-4B.

The triplexer 10 may further include at least one bonding pad 160. The bonding pad 160 may be on, e.g., directly on, the first surface 112*a* of the second optics block 112. For example, the bonding pad 160 may be bent to extend on the angled first surface 112*a*. In other words, the bonding pad 160 may be positioned on the first portion 112*aa* and at least on one second portion 112*ab* of the first surface 112*a* of the second optics block 112. For example, as illustrated in FIG. 2, a plurality of bonding pads 160 may be positioned adjacent to the detectors 150*a*, 150*b*, so the bonding pads 160 may extend on both first and second portions 112*aa* and 112*ab*, while the detectors 150*a*, 150*b* may be only on the first portion 112*aa* of the first surface 112*a*. The bonding pad 160 may be formed on the second optics block 112 by bending electrical interconnections. Exemplary formation details of the bonding pads 160 on the first surface 111*a* are set forth in U.S. Pat. Nos. 7,224,856 and 6,777,767, both of which are hereby incorporated by reference in their entirety.

The triplexer 10 may be connected to the optical fiber 200 and the light source 300, e.g., a laser, and may receive/transmit wavelength optical signals, e.g., video, voice and/or data signals, therefrom. For example, when serving as a gateway between a FTTH optical network and subscribers' homes, the triplexer 10 may receive through the optical fiber 200 incoming video signals using a 1550 nm wavelength or incoming data signals using a 1490 nm wavelength, and may direct the received wavelengths toward the detectors 150*a*, 150*b*. The triplexer 10 may simultaneously transmit an outgoing data signal via the optical fiber 200 using a 1310 nm wavelength.

As discussed previously, the optical fiber 200 may be connected to the triplexer 10 at the bottom surface 112*a* of the second optics block 112, i.e., at the first port 113. Therefore, the first and second gratings 121 and 122, as well as the first and second mirrors 181 and 182, may be arranged in the triplexer 10 to facilitate propagation of light transmitted from the optical fiber 200 toward the detectors 150*a*, 150*b*. A fiber lens 210 may be provided between the optical fiber 200 and the triplexer 10 to collimate the light output by the fiber 200 and/or focus light from the light source into the fiber 200, or may be on first optics block 111. In other words, the fiber lens 210 may be between the fiber 200 and the first grating 121.

The light source 300 may operate at a 1310 nm wavelength, and may be positioned to face the first optics block 111, e.g., to face the first surface 111*a* of the first optics block 111. Light emitted from the light source 300 may be incident on the first optics block 111 through the second port 114, so the light may pass through the first optics block 111 to be incident on the second optics block 112 and to propagate therethrough, i.e., via the first and second gratings 121 and 122, as well as the first and second mirrors 181 and 182, toward the optical fiber 200. For example, the light source 300 may be aligned with a second lens 172 of the lens 170, e.g., to provide collimated light on the second grating 122.

In summary, an optics block may include a first port configured to optically communicate with an optical fiber outputting first light beam at a first wavelength and a second light beam at a second wavelength, and a second port configured to receive a third light beam at a third wavelength from a light source. A bounce cavity between the first and second ports may be formed by opposing mirrors adjacent respective surfaces of the optics block. First and second detectors configured to detect light at the first and second wavelengths, respectively, may be adjacent the second port. A first grating opposite the first port may receive all three light beams at substantially a same location thereon. A second grating opposite the second port may receive the three light beams at spatially separated portions thereon. Therefore, the first and second gratings may serve as a wavelength filter in the triplexer 10.

Figure 3:
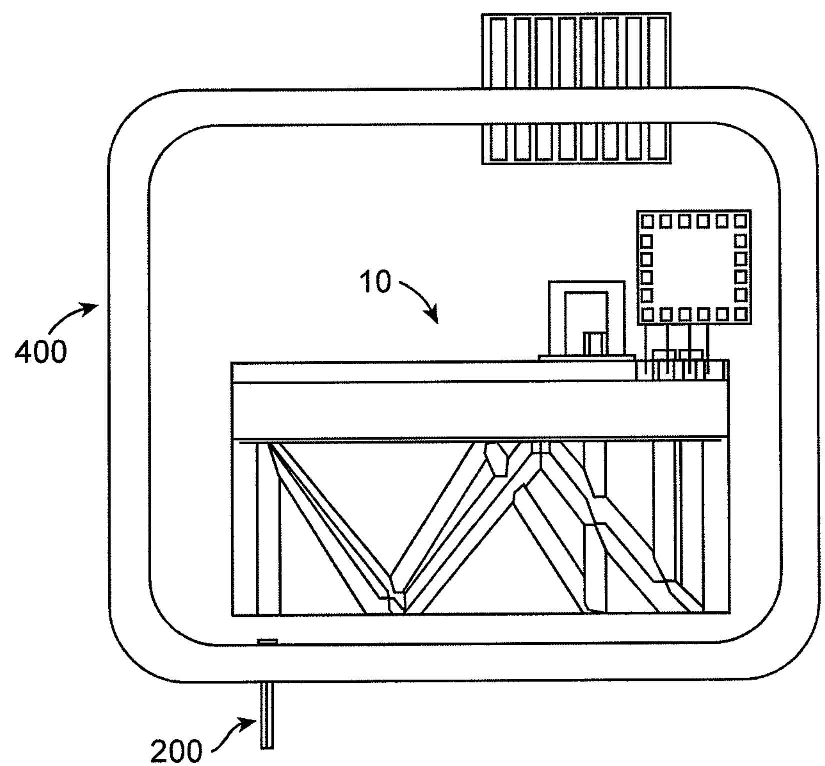
FIG. 3 illustrates a top view of a triplexer of FIG. 1 in a package according to an embodiment.
Figure 4A:
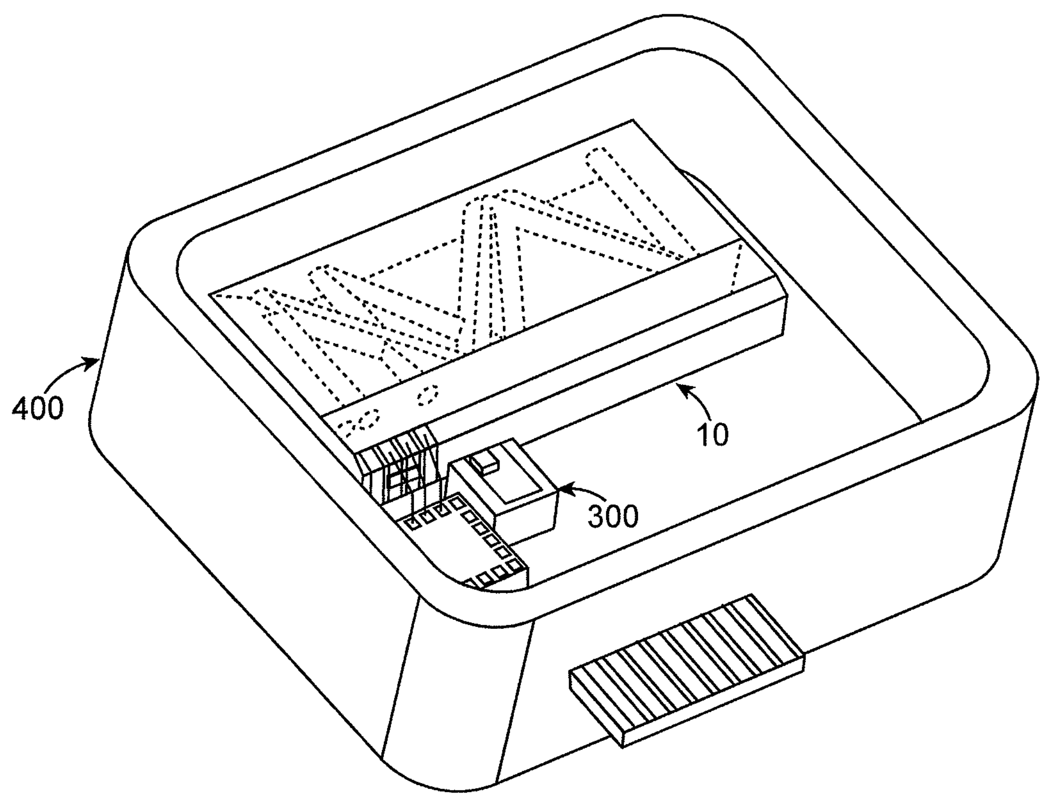
FIGS. 4A and 4B illustrate different perspective views of a triplexer in a package of FIG. 3.
Figure 4B:
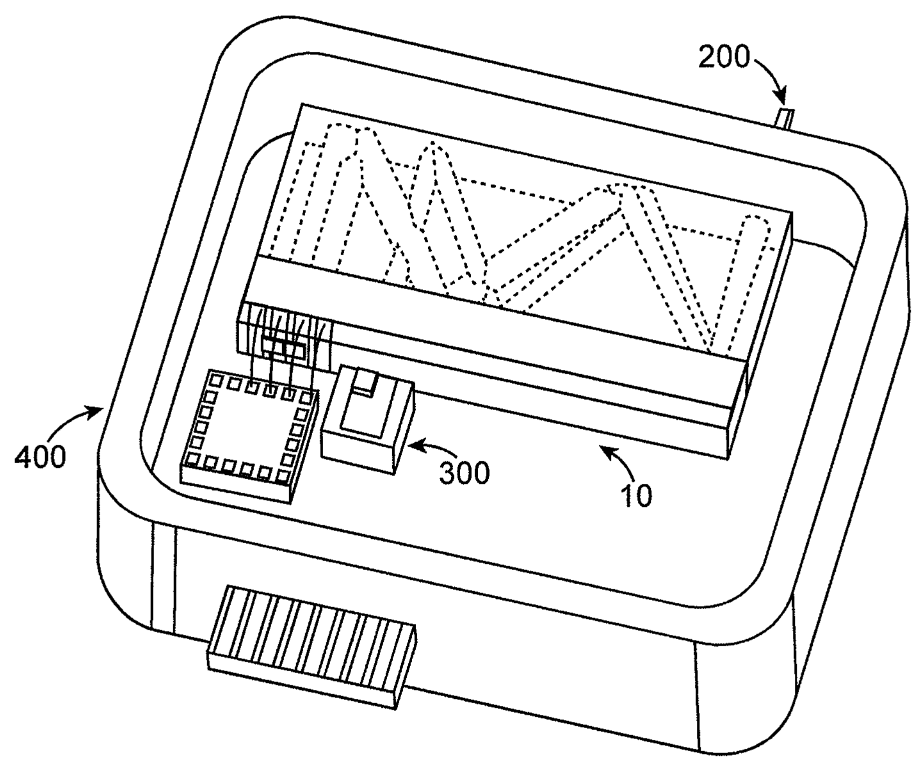

The triplexer 10 may be arranged with the light source 300 and the optical fiber 200 in a communication package. For example, as illustrated in FIGS. 3 and 4A-4B, the triplexer 10 and the light source 300 may be placed in a case 400, while the optical fiber 200 may be connected to the triplexer 10 in the case 400. In particular, an additional lens (not shown) may be positioned in a sidewall of the case 400, and the light source 300 may be placed in the case 400. Next, the triplexer 10 may be positioned in the case 400, so the first surface 112*a* may face the light source 300. The alignment of the light source 300 and the triplexer 10 may be passive, since the collimated laser beam may have a diameter, e.g., about 400 μm. Then, the optical fiber 200 may be arranged to extend through the case 400 to illuminate the fiber lens 210 to provide a collimated beam, e.g., having a beam diameter of 40-50 μm, to the first grating 122.

The bonding pads 160 of the triplexer 10 may be connected to electrical wiring in the case 400. Since the first and second detectors. 150*a*, 150*b* and the at least one bonding pad 160 are directly on the first optics block 111, packaging of the triplexer 10 in the package may be substantially cheaper and easier. For example, since the bonding pads 160 are on an angled surface, i.e., first and second portions 111*aa* and 111*ab*, connection of electrical wires to the bonding pads 160 may be facilitated after placement of the triplexer 10 in the case 400, i.e., rotation of the triplexer 10 by 90° to position the triplexer 10 in the case 400.

Figure 6:
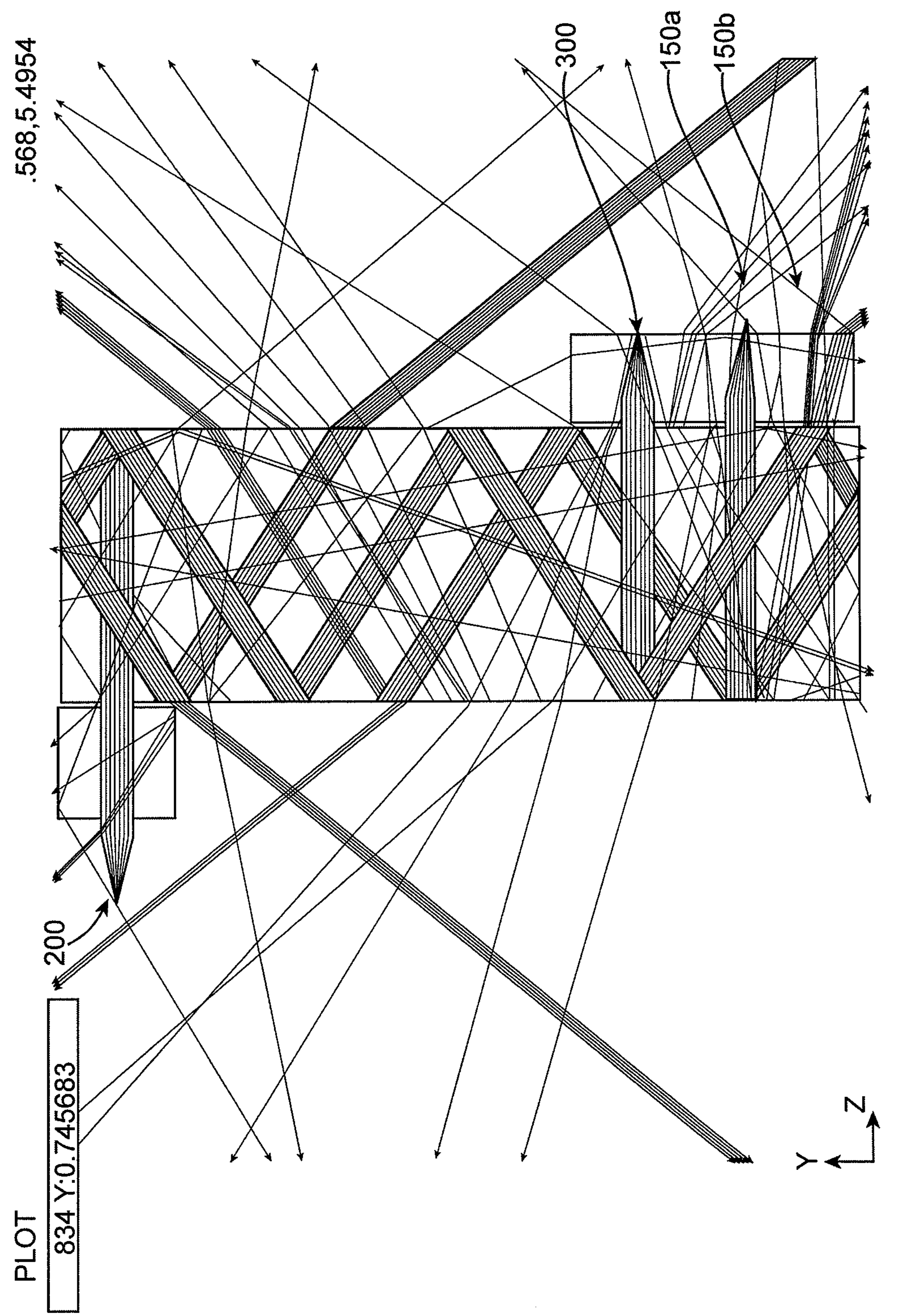
FIG. 6 illustrates a full ray trace for light from a laser through a triplexer of FIG. 1.
Figure 7:
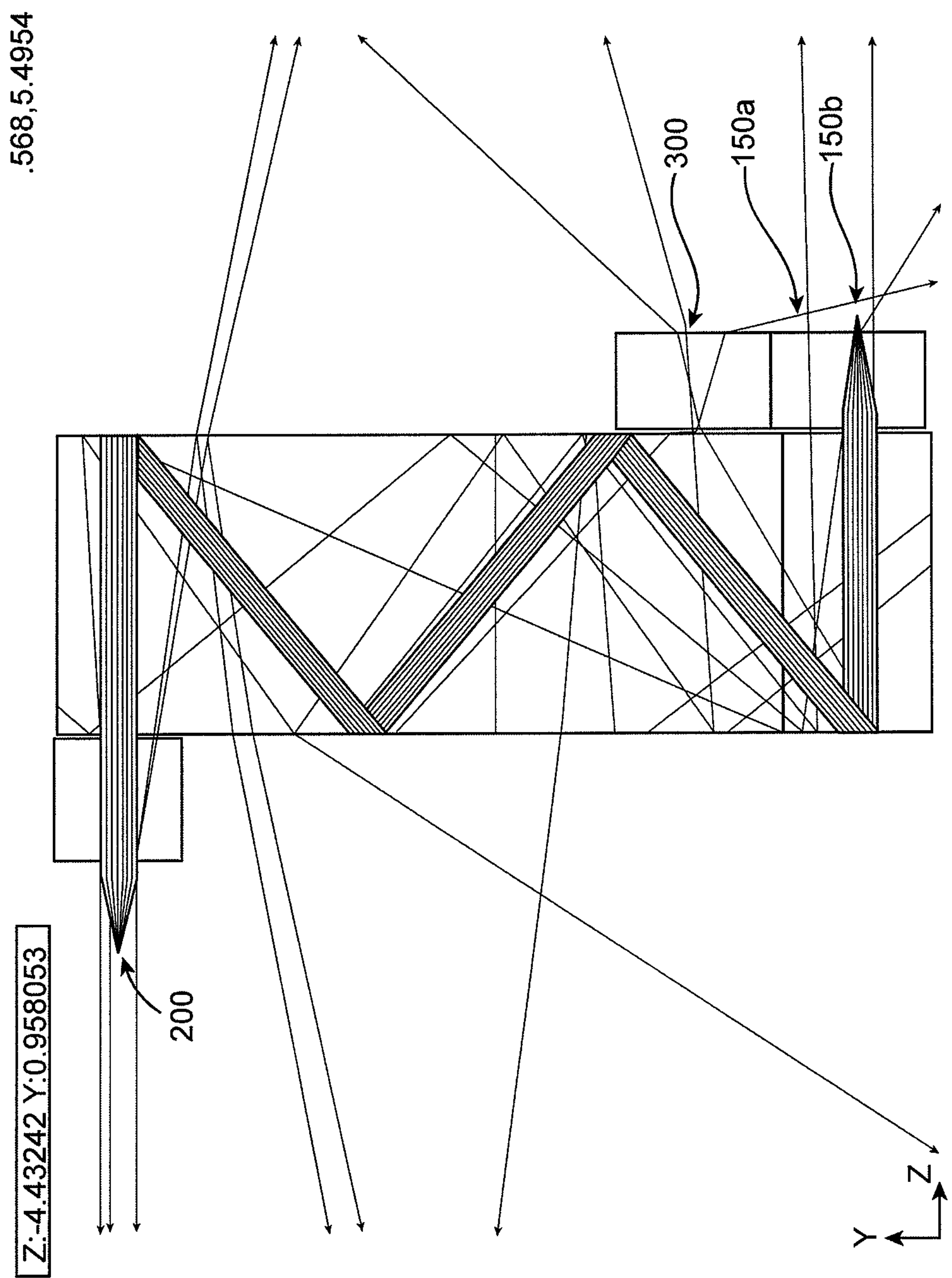
FIG. 7 illustrates a full ray trace for light from a fiber through a triplexer of FIG. 1.

FIG. 6 illustrates the beam path for 1310 nm light from the light source 300 and FIG. 7 illustrates the beam path for 1550 nm light from the fiber 200. As can be seen from FIGS. 6 and 7 therein, the unique first order diffraction angles for each wavelength may be sufficient as the light travels through the bounce cavity defined by the mirrors 181 and 182 as the light traverses the second substrate 112 to provide wavelength filtering. For example, while the received beams are not separated distinctly when incident on the first mirror 181, when they reach the second diffraction grating 122, they are separated. The second diffraction grating 122 may include three unique sections, each designed for the specific wavelength incident thereon, i.e., having different etch depths to optimize efficiency for each wavelength.

Figure 8:
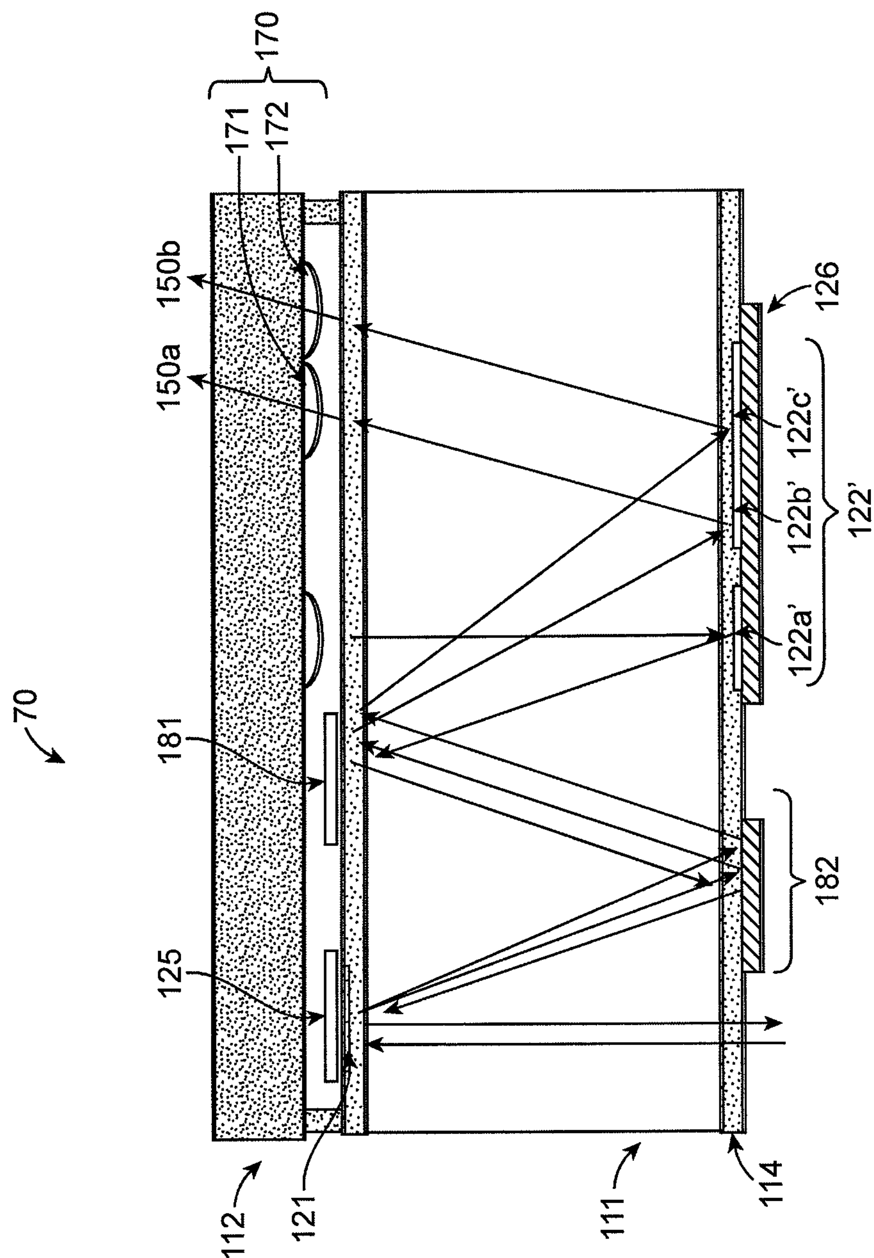
FIG. 8 illustrates a cross-sectional view of a triplexer according to an embodiment.

Another embodiment of a triplexer 70 is illustrated in FIG. 8. Elements that are the same as those of FIG. 1 will have the same reference numerals, and a detailed description thereof may not be repeated. Additionally, the beam paths and functioning of the triplexer 70 are analogous to those of the triplexer 10, and a detailed description thereof may not be repeated. Here, the first diffractive grating 121 may be the same as that in FIG. 1, but a second diffractive grating 122' may not deflect the received beams as much as the second diffractive grating 122 of FIG. 1, i.e., light will not be normally incident on the detectors 150*a*, 150*b*. The smaller deflection increases the efficiency of the second diffractive grating 122'.

In detail, the second diffractive grating 122' may include three grating sections 122*a*', 122*b*', and 122*c*', for the three different wavelengths, e.g., 1310 nm, 1490 nm, and 1550 nm, respectively. In accordance with the present embodiment, the first grating 121 and the second grating section 122*a*' may have the same grating period, e.g., 1.7 μm, while the second grating sections 122*b*' and 122*c*' may have the same etch depth, e.g., 5 μm. Detailed examples of particular gratings are discussed in further detail with respect to FIGS. 13 and 14 below.

In the triplexer 70, a layer of replication material 114 may be provided on the upper and lower surfaces of the substrate 112. The replication material may be any appropriate material. For example, a replication material may be a deformable but curable material, e.g., heat curable or light, e.g., ultraviolet (UV), curable. The curing process may be achieved in different manners, including for example through UV exposure, or anaerobic, chemical, or heat processes. Examples of replication materials include UV curable polymers, UV curable monomers, thermoplastics, thermosets and composite materials, e.g., sol-gel or FROM 128. Suitable replication techniques include UV embossing, hot embossing, nano-imprinting, etc. The first and second diffractive gratings 121 and 122*a* may be formed in the replication material 114. Then, a highly reflective material, e.g., aluminum, may be provided on each of the diffractive gratings 121, 122*a*, to provide coatings 125, 126 to further increase the efficiency of the triplexer 70. Of course, replication material 114 and/or the coatings 125, 126 may only be used for one, of the first and second diffractive gratings 121, 122'.

Figure 9:
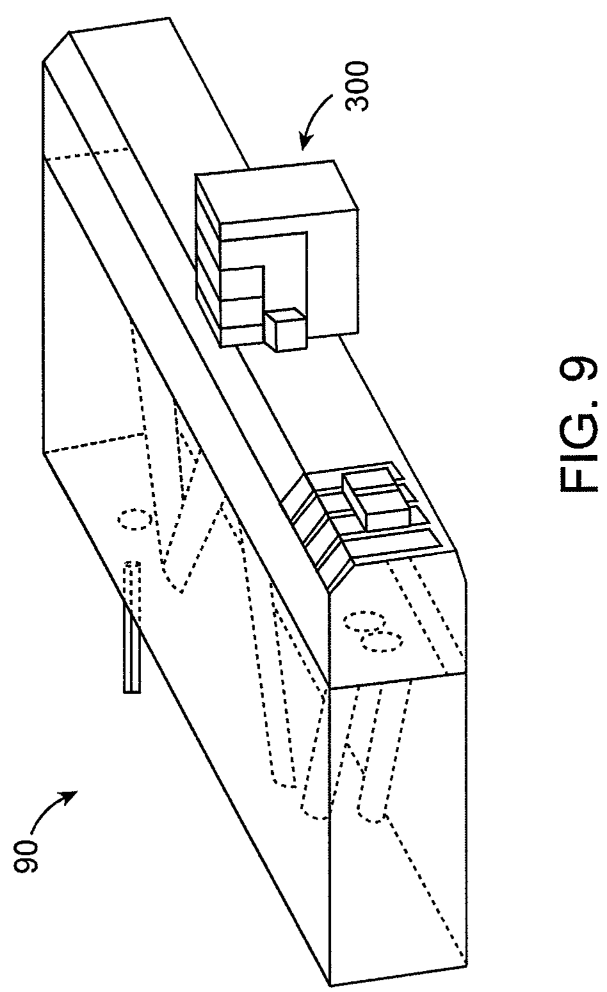
FIG. 9 illustrates a perspective view of a triplexer according to an embodiment.

Another embodiment of a triplexer 90 is illustrated in FIG. 9. Elements that are the same as those of FIGS. 1 and 8 will have the same reference numerals, and a detailed description thereof may not be repeated. Additionally, the beam paths and functioning of the triplexer 70 are analogous to those of the triplexer 10, and a detailed description thereof may not be repeated. In the triplexer 90, the light source 300 is rotated by 90° as compared with its position in FIGS. 1 and 8 to thereby rotate the polarization of the light output therefrom. For implementation, the gap between the detectors and the laser 300 will be larger for the triplexer of FIG. 8 than for that of FIG. 1.

Figure 10:
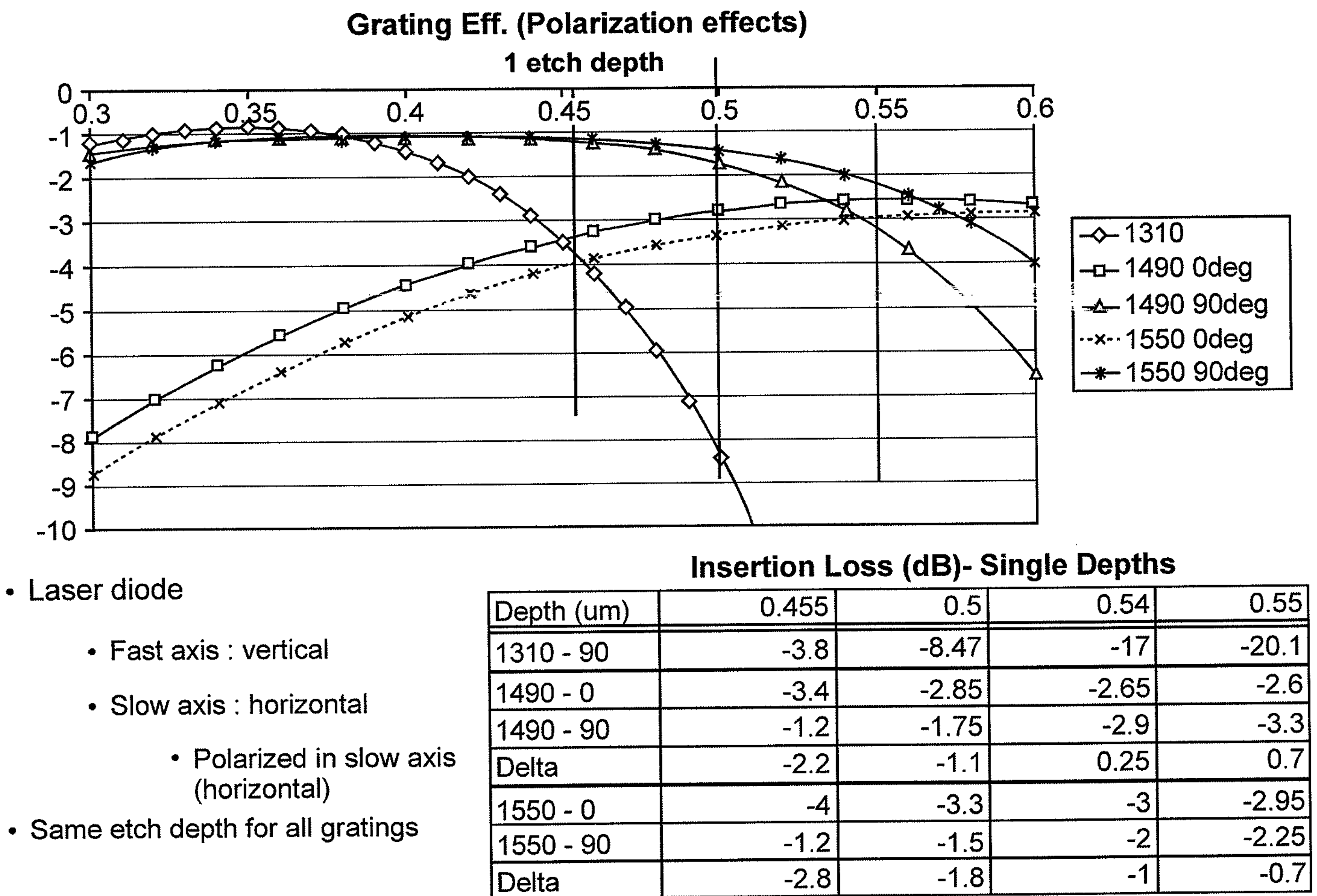
FIGS. 10-14 illustrate the effect different polarizations have on the efficiencies of the different gratings.
Figure 11:
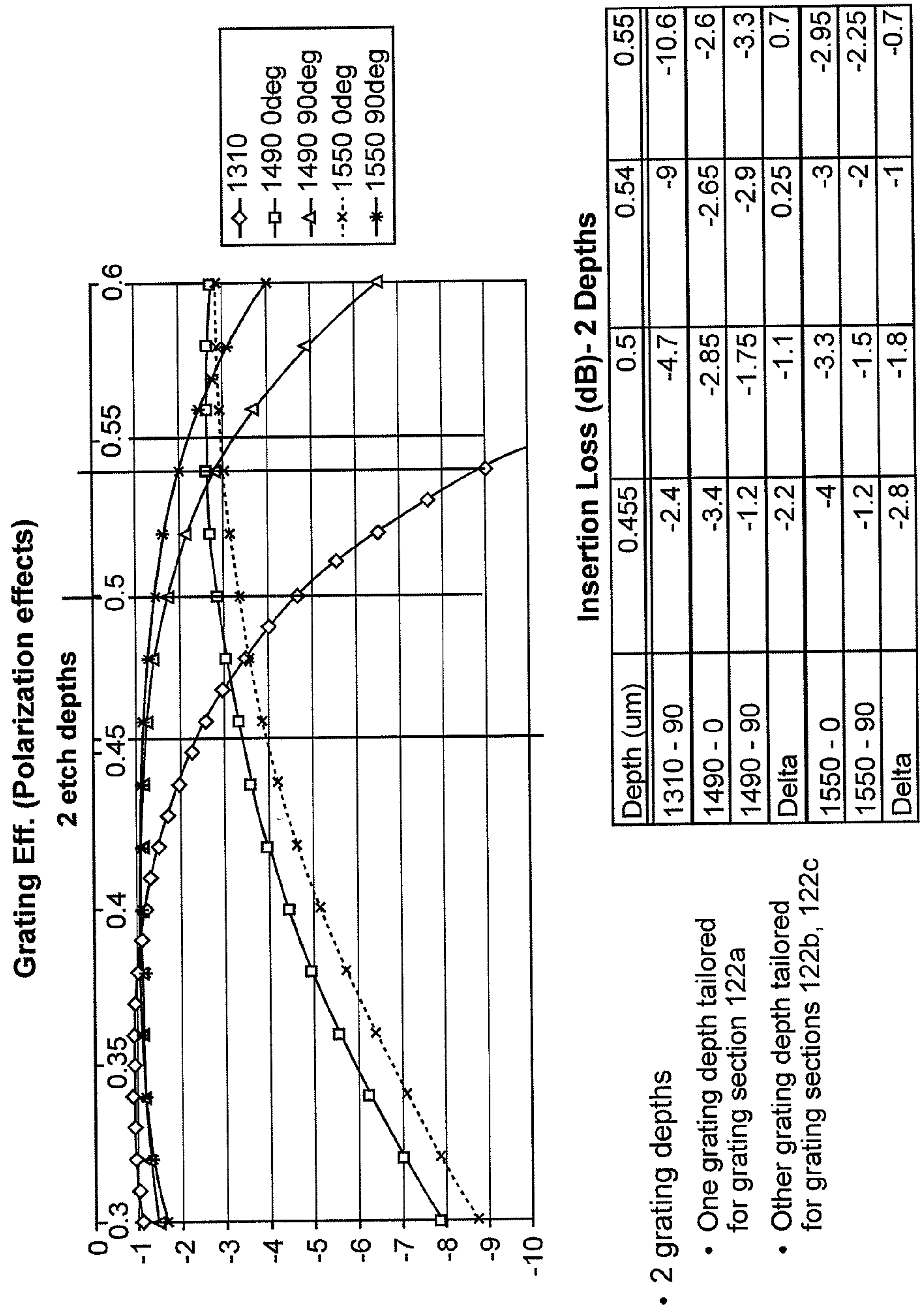
Figure 12:
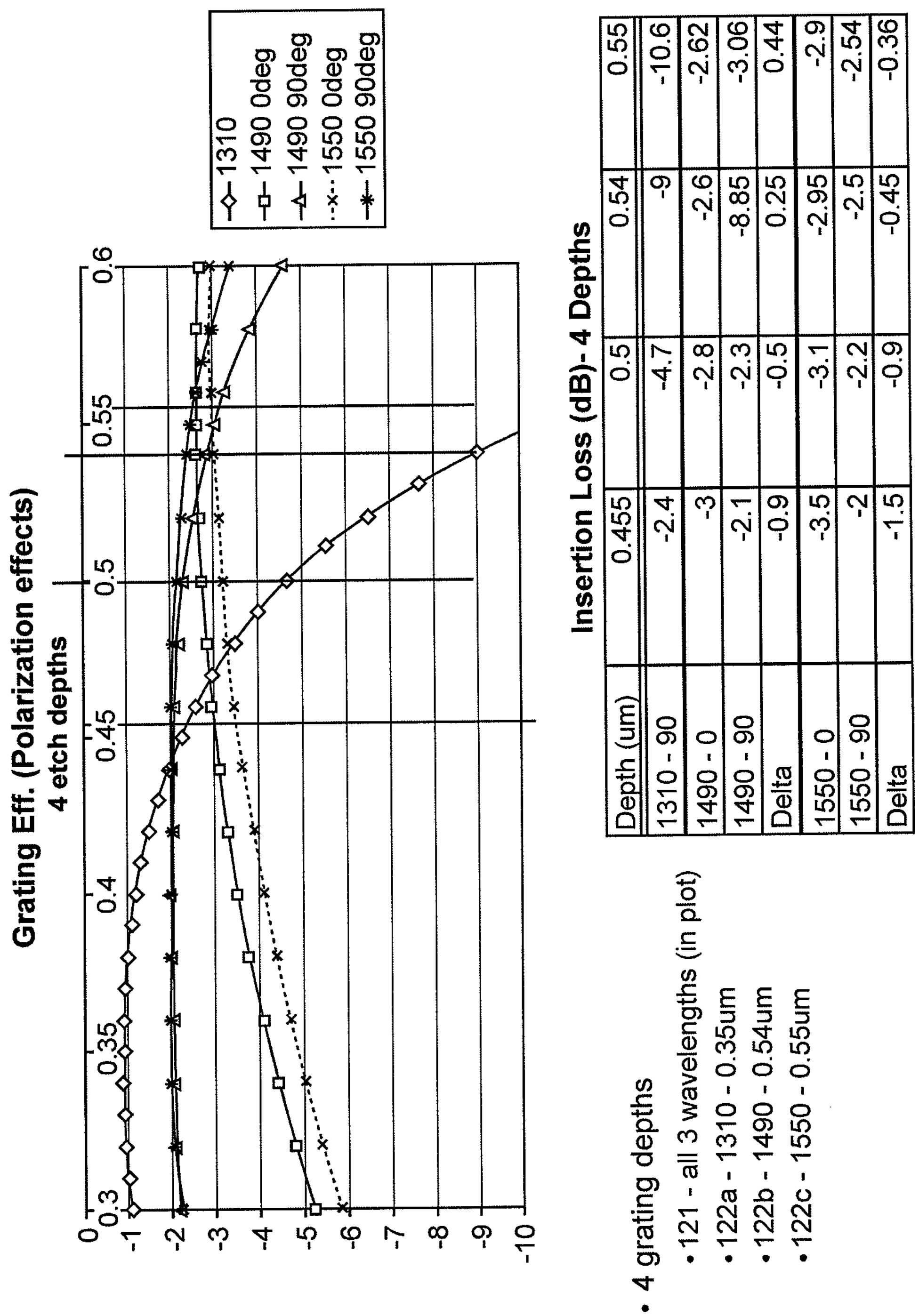

The effect of polarization on the efficiencies of the gratings is illustrated in FIGS. 10 to 13. In particular, FIGS. 10 to 12 illustrate the effect of polarization on the efficiencies of the triplexer on the different wavelengths using the same etch depth across all gratings, two etch depths, i.e., one etch depth for the grating 121 and a different etch depth for the grating 122 and four etch depths, i.e., one etch depth for the grating 121 and three different etch depths in the three corresponding sections for the grating 122, respectively. As can be seen therein, tailoring the etch depths for the different gratings/sections increases the efficiency for all wavelengths and reduces the delta between efficiencies for the two orthogonal polarizations. While light output from the laser may be controlled to have a single polarization, light incident on the detectors will have both polarization components. Therefore, the gratings should be optimized for both total efficiency and delta between efficiencies for the 1490 and 1550 nm.

Figure 13:
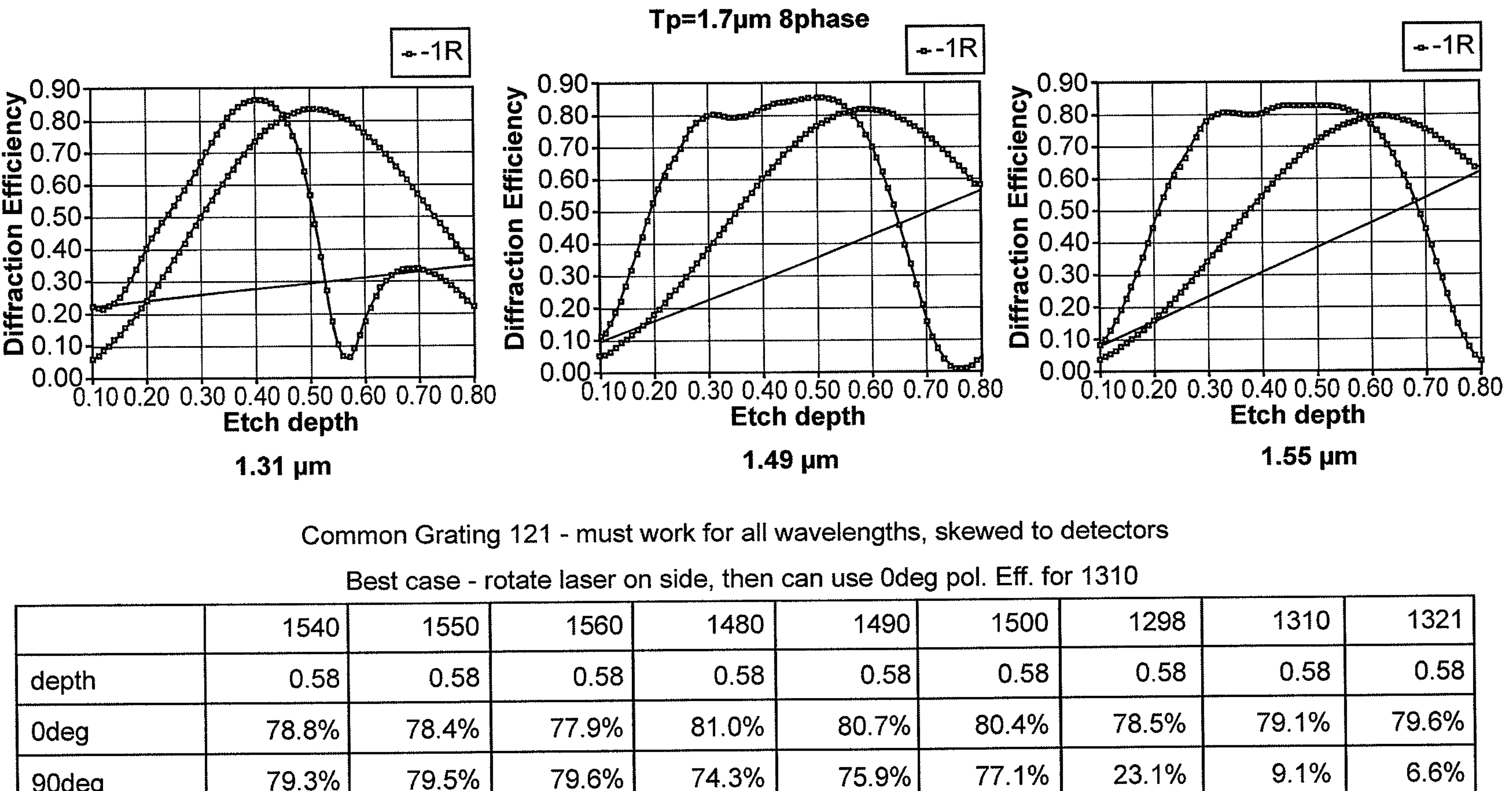

As shown in FIG. 13, when the polarization of the light source 300 is rotated, e.g., by physically rotating the laser as illustrated in FIG. 9, the efficiency of the 1310 nm light may be dramatically improved. Here, the grating 121 is an eight phase grating having a grating period of 1.7 and etch depth of 0.58 microns.

Figure 14:
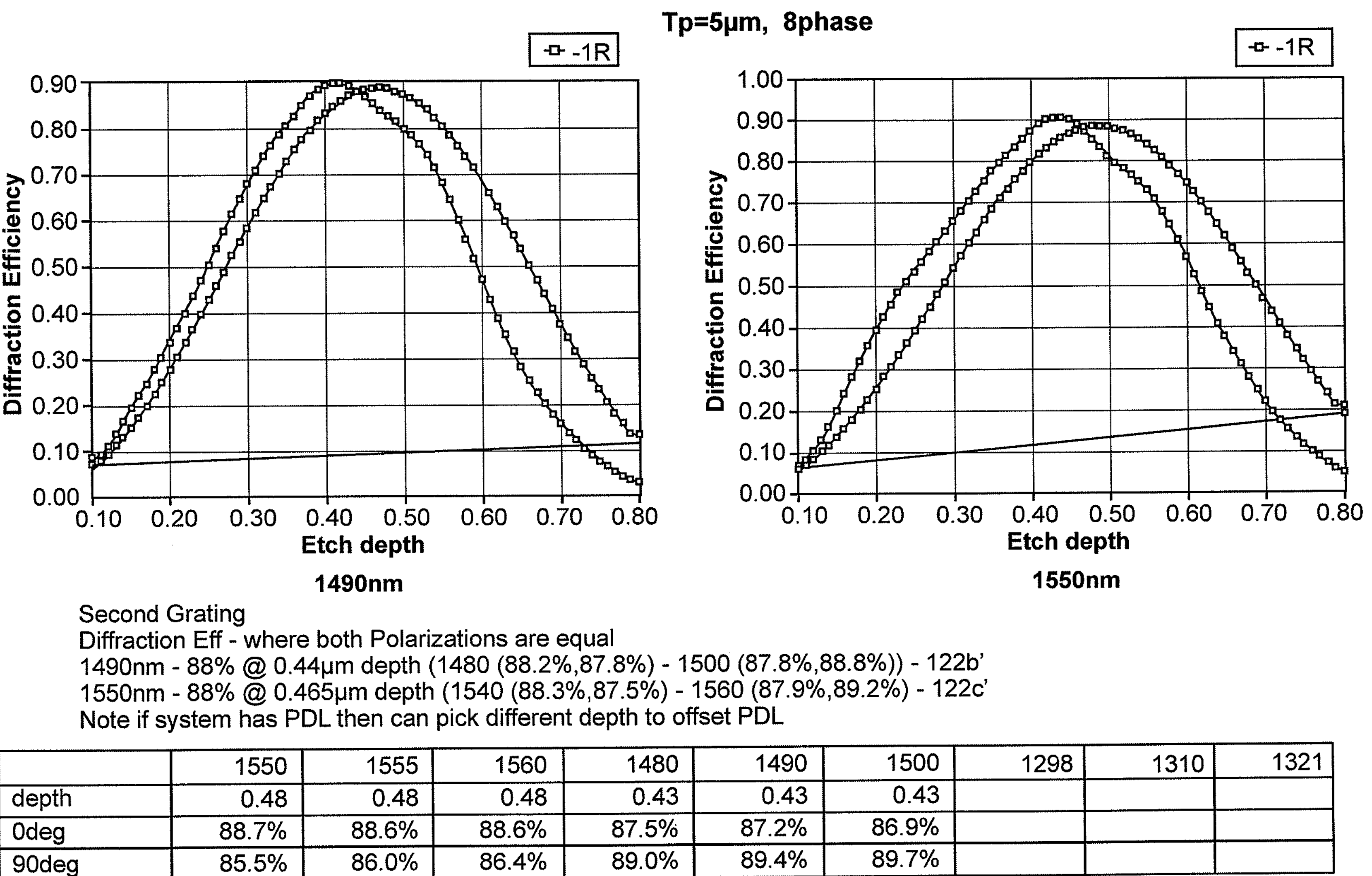

The effect of polarization on the efficiencies of the second grating 122 is illustrated in FIG. 14, in which different sections 122*a*', 122*b*', and 122*c*' of the second grating 122', which here is an eight phase grating having a grating period of 5 microns, have different etch depths. For example, the second grating section 122*a*' on which the 1310 light is incident may have an etch depth of 0.35 microns at a grating period of 1.7, i.e., may be the same as that for the grating 121 discussed with respect to FIG. 13. The second grating section 122*b*' on which the 1490 light is incident may have an etch depth of 0.44 microns, while the second grating 122*c*' on which the 1550 light is incident may have an etch depth of 0.465 microns. This design for the grating 122 may be used for the particular configuration illustrated in FIG. 8, in which the 1490 and 1550 nm light is output from the grating at an angle, while the 1310 light is incident normal to the grating 122'. If all beams have the same angle relative to the grating 122, as illustrated, e.g., in FIG. 1, all sections may have the same period, e.g., 1.7, for all three different total grating depths.

An optical package with a triplexer according to an example embodiment may include detectors and bonding pads directly on an optics block and two gratings on the optics block instead of conventional thin film filters. The structure of the detectors and bonding pads may reduce costs thereof and facilitate wiring. The use of gratings instead of thin film filters may substantially reduce costs while maintaining high isolation between wavelengths. While gratings may cause some insertion loss, these losses may be compensated as discussed above.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A triplexer, comprising:

an optics block including a first port configured to receive a first light beam at a first wavelength and a second light beam at a second wavelength, and a second port configured to receive a third light beam at a third wavelength;

a bounce cavity between the first and second ports, the bounce cavity being formed by opposing reflective elements adjacent respective surfaces of the optics block;

a first grating opposite the first port, the first grating receiving all three light beams at substantially a same location thereon, the first grating configured to provide the first and second light beams to the bounce cavity and the third light beam to the first port; and a second grating opposite the second port, the second grating receiving the first and second light beams at spatially separated portions thereon, the second grating configured to provide the first and second light beams adjacent the second port.

2. The triplexer as claimed in claim 1, further comprising:

another optics block, another optics block including parallel first and second surfaces;

first and second detectors mounted on the another optics block, the first and second detectors mounted to receive the first and second light beams, respectively; and bonding pads directly on the another optics block for the first and second detectors.

3. The triplexer as claimed in claim 2, wherein the first surface of the another optics block includes a first portion and a second portion, the first portion being substantially parallel to the second surface, and the second portion being angled at an acute angle with respect to the first portion.

4. The triplexer as claimed in claim 3, wherein the first and second detectors are on the first portion of the first surface, and the bonding pad extends on the first and second portions of the first surface.

5. The triplexer as claimed in claim 1, wherein the optics block includes a first optics block and a second optics block, the first and second optics blocks being stacked on each other.

6. The triplexer as claimed in claim 5, wherein the first and second detectors are directly on a first surface of the second optics block, the first surface of the second optics block facing away from the first optics block.

7. The triplexer as claimed in claim 6, wherein the first grating is between the first and second optics blocks, the second grating is on a first surface of the first optics block facing away from the second optics block, and the triplexer further comprising first and second lenses on the second optics block facing the first optics block between the second grating and the first and second detectors.

8. The triplexer as claimed in claim 6, wherein the second grating is on a second surface, parallel to the first surface, of the first optics block.

9. The triplexer as claimed in claim 6, further comprising first and second bonding pads directly on the first surface of the second optics block, the first and second bonding pads being adjacent to the first and second detectors.

10. The triplexer as claimed in claim 9, wherein the first surface of the second optics block includes a first portion and a second portion, the first portion being substantially parallel to the second surface of the second optics block, and the second portion being angled at an acute angle with respect to the first portion.

11. The triplexer as claimed in claim 10, wherein the first and second detectors are on the first portion of the first surface of the first optics block, and the first and second bonding pads extend on the first and second portions of the first surface of the second optics block.

12. The triplexer as claimed in claim 6, wherein the second optics block is a silicon optics block, and the first optics block is a silicon oxide optics block.

13. The triplexer as claimed in claim 6, wherein the second grating is on a first surface of the first optics block facing away from the second optics block, the second grating including first through third sections corresponding to the spatially separated portions, each of the first through third section having a different etch depths.

14. The triplexer as claimed in claim 1, wherein the second grating further receives the third light beam at a spatially separated portion from the first and second light beams, the second grating including first through third sections corresponding to the spatially separated portions, each of the first through third section having different etch depths.

15. The triplexer as claimed in claim 1, further comprising a highly reflective coating on at least one of the first and second gratings.

16. The triplexer as claimed in claim 1, wherein the optics block includes opposing parallel first and second surfaces, the first port, the first mirror, and the second grating being on the first surface, and the first grating, second mirror, and the second port being on the second surface.

17. The triplexer as claimed in claim 1, further comprising a replication material on at least one of the first and second surfaces, wherein a grating on a surface containing replication material is in the replication material.

18. The triplexer as claimed in claim 1, further comprising a collimating lens collimating the third light beam.

19. The triplexer as claimed in claim 1, further comprising a lens adjacent the first port, the lens focusing the third light beam outside the triplexer and collimating the first and second light beams.

20. The triplexer as claimed in claim 1, further comprising a half-wave plate adjacent the second port.

21. The triplexer as claimed in claim 1, wherein one of the opposing reflective elements is a selectively reflective element that transmits light at the third wavelength and reflects light at the first and second wavelengths.

22. The triplexer as claimed in claim 21, wherein the selectively reflective element is adjacent the second port.

23. The triplexer as claimed in claim 1, further comprising a third grating, adjacent the second port, the third grating configured to provide the third light beam to the bounce cavity.

24. A communication package, comprising:

an optical fiber; and a triplexer connected to the optical fiber, the triplexer including:

an optics block having a first port configured to optically communicate with the optical fiber outputting first light beam at a first wavelength and a second light beam at a second wavelength, and a second port configured to receive a third light beam at a third wavelength from a light source;

a bounce cavity between the first and second ports, the bounce cavity being formed by opposing reflective elements adjacent the optics block;

first and second detectors configured to detect light at the first and second wavelengths, respectively, the first and second detectors being adjacent the second port;

a first grating opposite the first port, the first grating receiving all three light beams at substantially a same location thereon, the first grating configured to provide the first and second light beams to the bounce cavity and the third light beam to the optical fiber; and a second grating opposite the second port, the second grating receiving the first and second light beams at spatially separated portions thereon.

25. The communication package as claimed in claim 24, wherein the optics block includes first and second optics blocks stacked on each other, the first and second detectors being directly on the second optics block.

26. The communication package as claimed in claim 24, wherein the light source is mounted on the optics block.

27. The communication package as claimed in claim 24, wherein an output face of the light source is mounted orthogonal to the second port.

* * * * *